July 25, 1950

M. H. GRAHAM 2,516,202

PRESSURE COOKER

Filed Sept. 19, 1944

INVENTOR:-
MAURICE H. GRAHAM

BY  *Parry + Miller*

ATTYS.

July 25, 1950 M. H. GRAHAM 2,516,202
PRESSURE COOKER
Filed Sept. 19, 1944 9 Sheets-Sheet 3

INVENTOR:-
MAURICE H. GRAHAM
BY Parry + Miller
ATTYS.

July 25, 1950  M. H. GRAHAM  2,516,202
PRESSURE COOKER
Filed Sept. 19, 1944  9 Sheets-Sheet 5

INVENTOR:-
MAURICE H. GRAHAM
BY Parry + Miller ATTYS.

July 25, 1950 M. H. GRAHAM 2,516,202
PRESSURE COOKER

Filed Sept. 19, 1944 9 Sheets-Sheet 6

INVENTOR:-
MAURICE H. GRAHAM
BY Parry + Miller ATTYS.

July 25, 1950  M. H. GRAHAM  2,516,202
PRESSURE COOKER

Filed Sept. 19, 1944  9 Sheets-Sheet 7

INVENTOR:-
MAURICE H. GRAHAM
BY Parry & Miller ATTYS.

July 25, 1950 M. H. GRAHAM 2,516,202
PRESSURE COOKER
Filed Sept. 19, 1944 9 Sheets-Sheet 8

INVENTOR.-
MAURICE H. GRAHAM
BY Parry + Miller ATTYS.

July 25, 1950

M. H. GRAHAM 2,516,202

PRESSURE COOKER

Filed Sept. 19, 1944

INVENTOR:-
MAURICE H. GRAHAM

BY *Parry & Miller* ATTYS.

Patented July 25, 1950

2,516,202

UNITED STATES PATENT OFFICE 2,516,202

PRESSURE COOKER

Maurice H. Graham, St. Louis Park, Minn.

Application September 19, 1944, Serial No. 554,825

14 Claims. (Cl. 220—57)

This invention relates to pressure cookers such as employed to cook foods under steam pressure, and is particularly directed to novel and improved sealing means in and for a pressure cooker.

A general object of the invention is to provide novel pressure cooker sealing means which is subject to automatic control to accomplish one or more selected purposes. Such purposes include providing for the preliminary venting of air from the cooker until cooking temperature has been reached, initiation of a seal, tightening and maintenance of a seal to withstand normal pressure cooking conditions, temporary breaking of the seal if and when conditions become abnormal and breaking of the seal at the end of the cooking period.

A further general object of the invention is to provide novel pressure cooker sealing means which is responsive to a change or changes in conditions within the pressure cooker.

Another object of the invention is to provide a pressure cooker with sealing means subject to influence by a deformable member designed to respond to predetermined pressure cooker conditions.

A specific, but important object of the invention, adapted to be realized in preferred but in not all embodiments, is to provide a novel and improved pressure cooker cover sealing means; and further, to provide sealing means which is adapted automatically to make and/or break sealing engagement between a pressure cooker body and removable cover while the cover is secured to the body and independently of manually operable pressure-applying cover-securing bolts, clamps, cam locks and equivalent fastenings such as conventionally employed in pressure cookers to initiate, maintain and break the cover seal.

According to the invention the cooker body and cover structure are provided with coacting surface portions adapted to make sealing engagement with each other and capable of relative movement while the cover structure is secured to the body by suitable securing means. The cover structure will be constructed as a deformable member, or either the cover structure or the cooker body will carry an auxiliary deformable member. In any of such forms the deformable member will be constructed and arranged to deform in response to one or more predetermined changes in internal condition of the cooker to produce various relationships between the coacting sealing surfaces. However, the member must be so constituted as to resist undesired deformation during the cooker operation under normal high cooking temperatures and pressures so that a pressure-tight cover seal can be maintained under such conditions.

Depending upon which one or more of the previously stated purposes is to be accomplished, the cover sealing means may be made to respond to pressure cooker temperature or both to pressure and temperature. All of the indicated purposes may be accomplished in one pressure cooker, and the advantages of such a form of the invention include not only the convenience of fully automatic operation of the sealing means, but also a simplified pressure cooker construction which does not require objectionable but conventionally used manually operable mechanical pressure-applying cover-securing fastenings and conventional excess pressure relief valves. However, in some embodiments of the pressure cooker automatically responsive sealing means may be employed in conjunction with pressure-applying cover fastenings, and in some embodiments also my novel sealing means may be employed in conjunction with known pressure relief valves.

Having generally described the objects and nature of the invention, reference is made to the various exemplary embodiments thereof illustrated in the accompanying drawings and the detailed description thereof which follows for a fuller understanding.

The pressure cooker shown in Figs. 1 to 6 comprises a two-piece housing including a rigid heavy metal cooker body or vessel 40 and a removable cover member 41 adapted to close the top opening of the body and form with the body a pressure-tight chamber of suitable size to receive food or other articles to be cooked. The inner side of the wall of the cooker body surrounding the top opening is beveled to form an annular sealing seat 42 adapted to make sealing engagement with the inclined outer peripheral surface of a sealing element in the form of an annular gasket 43 secured to the outer edge of cover 41. The gasket will be composed of rubber or other flexible compressible material adapted to make a pressure tight seal with seat 42, and depending from the lower side thereof is a flexible lip 44.

Whereas pressure cooker covers are conventionally of rigid construction so as to maintain their shape under all conditions, cover member 41 in the present embodiment of the invention is constructed and arranged to be deformable under certain changes in condition of the pressure cooker. The same comprises a bimetal disc adapted to warp or deform in response to temperature, but of sufficient gauge and stiffness to resist deformation under normal steam pressures employed in the cooking chamber. One lamination of the bimetal cover will comprise Invar steel or other durable metal having a relatively low coefficient of expansion, while the other lamination will comprise a metal having a high coefficient of expansion such as any of a variety of ferronickel alloy steels with a nickel content above 35%. The two laminations are firmly bonded together with the more expansible metal on top. With increasing temperature the cover warps downwardly throughout its areas relative to its center and will warp upwardly in response to cooling from high temperature. I found that for a cover of eight inch diameter a one-eighth gauge of bimetal will satisfactorily resist warping upwardly under internal steam pressures up to thirty-five or forty pounds, and well above normal cooking pressure.

Cover 41 is essentially a thermostatic member responsive to pressure cooker temperature, and its variations in shape control the relative position of sealing gasket 43 and the coacting sealing seat 42 of the cooker body. The cover is supported only at its center instead of having its outer periphery rigidly secured to the cooker body as in the majority of conventional pressure cookers. Any suitable form of mounting may be employed to detachably support the cover on the cooker body. The mounting here illustrated comprises a pair of rigid crossed arms 45 and 46 and downwardly extending central hub 47 bored to receive a bolt 48. The center of cover 41 is apertured to be received on the lower end of the bolt, and is held in sealing engagement with bolt flange 49 by a sealing washer 50 and threaded nut 51.

Figures 1, 2, 5, 6:
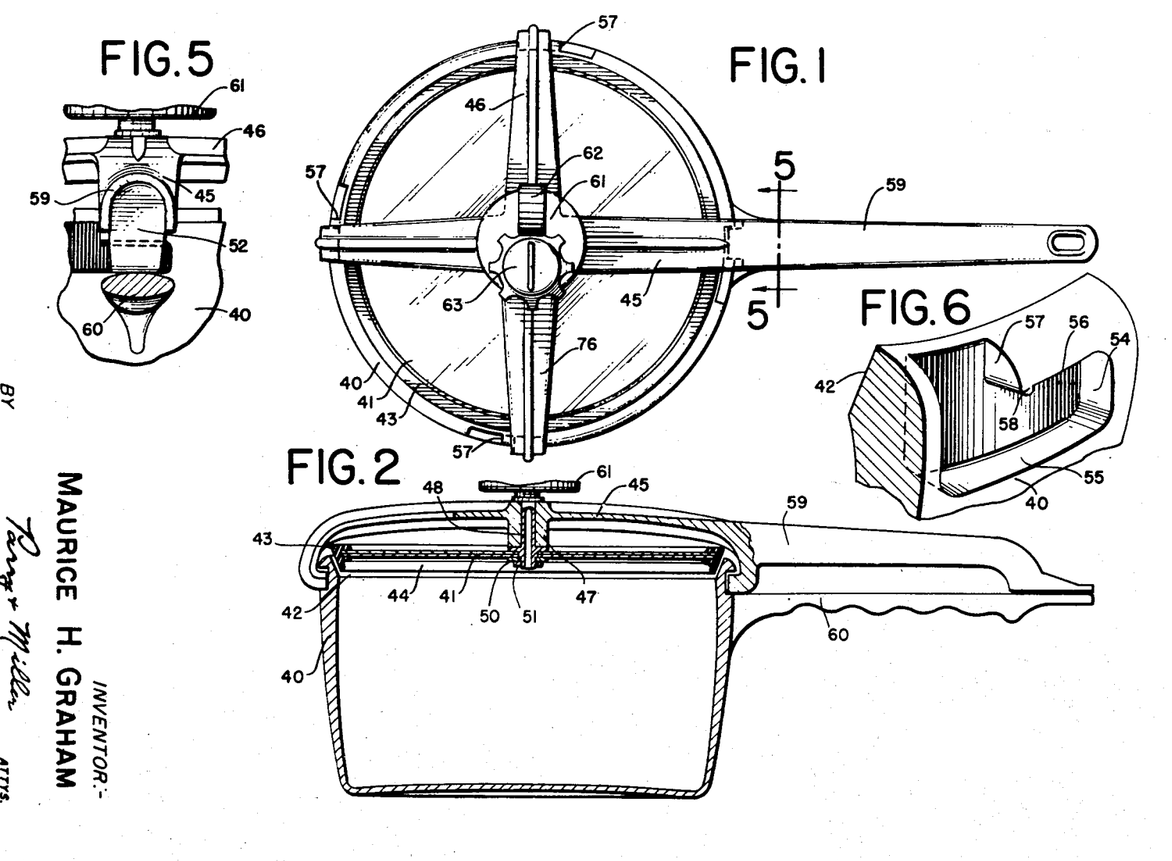
Fig. 1 is a top plan view of a pressure cooker showing the cover secured to the cooker body and illustrating one form of the invention.
Fig. 2 is a vertical section corresponding to Fig. 1 and showing the non-sealing position of the cover sealing means.
Fig. 5 is a fragmentary sectional elevation taken approximately on the line 5—5 of Fig. 1.
Fig. 6 is a fragmentary perspective view, partly in section, of an upper side portion of the cooker body containing one of the elements for connecting the cover to the body.

The ends of the mounting arms are turned downwardly to form supporting legs 52 provided at their lower extremities with inturned lugs 53 receivable in locking recesses 54 located in the outer side of cooker body 40 adjacent the top opening. As best shown in Fig. 6 recesses 54 have a lower surface 55 and an upper surface 56 and include an upwardly extending cut-away portion 57 through which lugs 54 may be inserted into the recesses when the mounting with the attached cover is applied to the cooker body. By rotating handle 59 formed as an extension 45 of the mounting relative to handle 60 on the cooker body the lugs are locked beneath recess surface 56. A locking bead 58 may be provided at the meeting point of surface 56 with cut-away portion 57 to insure against accidental rotation of the cover mounting at times when it should be locked to the cooker body. It will be observed that the lug-securing recesses 54 in the cooker body need not be of the camming type, since the sealing of the cover to the body in the present form of the invention is entirely independent of the cover securing connections.

Figure 3:
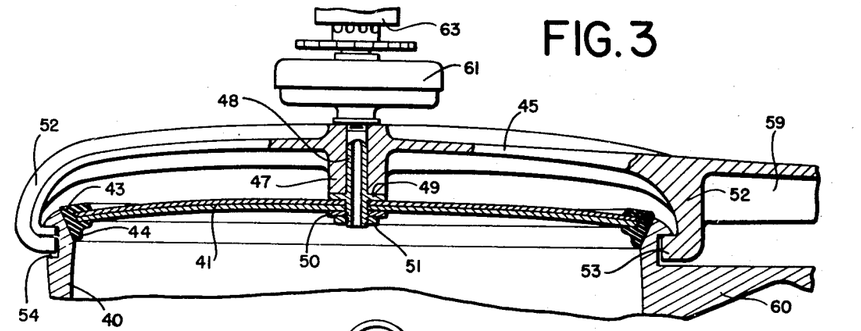
Fig. 3 is a fragmentary sectional elevation corresponding to Fig. 2, but showing the cover sealing means in sealing position.
Figure 4:
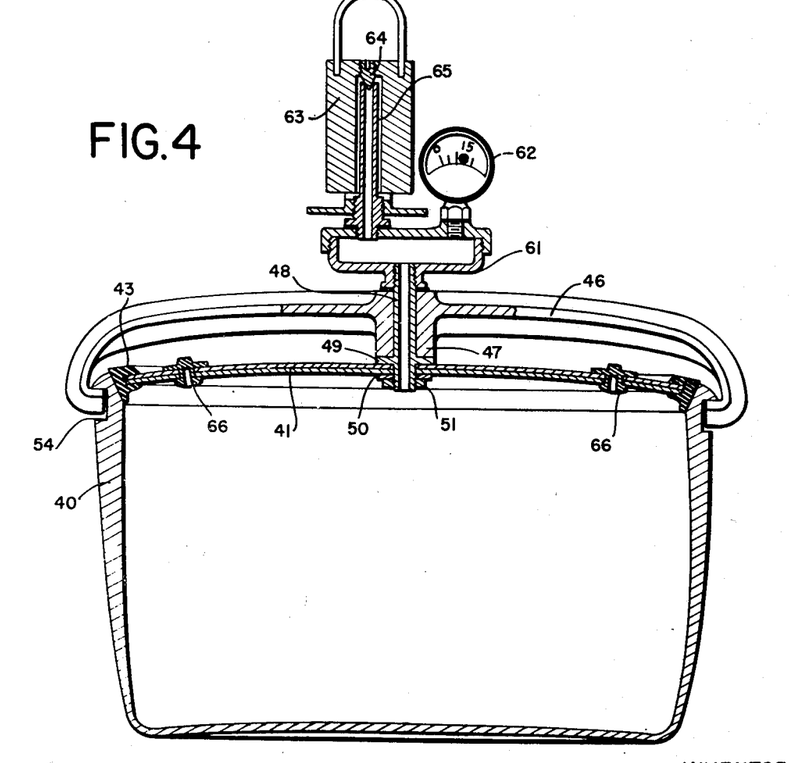
Fig. 4 is a sectional elevation taken at right angles to Figs. 3 and 4.

As will be observed from Fig. 2 the mounting supports cover 41 with its sealing gasket 43 in spaced relation to sealing seat 42 of the cooker body when the cover assembly is initially applied, thus providing a vent for the escape of air from the pressure cooking chamber. When heat is applied to the pressure cooker during the initial stage of a cooking operation cover 41 will gradually deform downwardly as the temperature increases to sealing engagement with the cooker body as shown in Fig. 3. By suitably proportioning the parts of the cover mounting in relation to the warping characteristics of the particular bimetal employed in the cover, the contact between gasket 43 and seat 42 can be delayed until the temperature of the cooker has risen sufficiently to generate steam, at or about 212° F., thus enabling substantially all air to be driven out of the cooking chamber and thereby increasing the efficiency of the pressure cooking operation.

As has just been indicated, initial sealing engagement of the cover is automatically effected in response to increasing temperature of the cooker through deformation of cover 41. Once the venting action has been discontinued and the initial seal effected, steam pressure builds up in the cooking chamber. Such pressure will act against lip 44 of gasket 43 and will serve to tighten the seal. Further, with increasing temperature, the cover will tend to deform downwardly to exert a downward stress on the sealing gasket. Thus it may be said that tightening and maintenance of the seal during the cooking operation is effected in response to both pressure and temperature.

In the event the internal cooking pressure becomes quite excessive, such pressure will act upwardly on the cover and deform it upwardly to automatically break the cover seal. This is possible because of the inclined arrangement of the sealing surfaces of gasket 43 and seat 42. Of course the seal will not be broken until the internal pressure has reached a point where its upward force against the underside of the cover will overcome the thermally developed downward force and the pressure developed lateral force tending to maintain pressure-tight sealing engagement. Such point will not ordinarily be attained unless and until the pressure has risen substantially above normal cooking pressure, and it is preferred in the present form to provide other means for venting excess steam pressure, as hereafter described.

The cover securing bolt 48 is made hollow and projects upwardly through the top of hub portion 47 of the cover mounting. Threaded on the upper end of the bolt is a pressure-tight housing 61. Mounted on such housing is a conventional pressure gauge 62 which is in communication with cooking chamber through bolt 48. Also mounted on housing 61 is a pressure relief valve designed to vent steam pressure whenever cooking pressure rises above a predetermined maximum, of say, fifteen or twenty pounds. Where such relief valve is employed, it is unnecessary to depend on upward deformation of the cover by pressure to break the cover seal, and consequently a lower cooking pressure can be maintained. The pressure relief valve 63 may be of any suitable form, and is here illustrated as comprising a hollow weight housing a valve body 64 coactive with the upper end of hollow tube 65 secured to housing 61. Conventional deformable pressure blow-off plugs 66 may also be provided in the cover if desired.

Not only is the present pressure cooker self-sealing in response to increasing temperature, but it is also automatically unsealing through cooling and upward warping of the cover at the end of the cooking period when heat is discontinued. Because of residual heat in the cooker some minutes may pass before the thermostatic cover 41 has cooled sufficiently to warp upwardly and break the cover seal. To hasten this action cold water may be run over the cover.

With the cover seal broken through the return of the cover and sealing gasket to its raised position shown in Fig. 2 the gasket is free of engagement of seat 42. The cover mounting may therefore be easily rotated and removed from the cooker body.

The further embodiment of the invention shown through Figs. 7 through 13 is generally similar to the embodiment previously described, but involves certain specific differences. The cooker body 70 is provided with a bimetal cover 71 similar to cover 41 previously described. Beveled sealing seat 72 surrounding the top opening of the cooker body is adapted to be engaged by gasket 73. Such gasket does not have a downwardly extending pressure responsive lip and because of this fact, and the inclined arrangement of the coacting sealing surfaces of the gasket and seat, the seal is adapted to be broken in response to slight excess pressure to provide an emergency pressure vent and cooking pressure control. Through selection of an appropriate gauge of bimetal for cover member 71 in relation to its diameter and thermal properties, the cover may be adapted to be deformed upwardly as soon as the pressure exceeds a selected maximum cooking pressure, say of fifteen or twenty pounds.

Figures 7, 9:
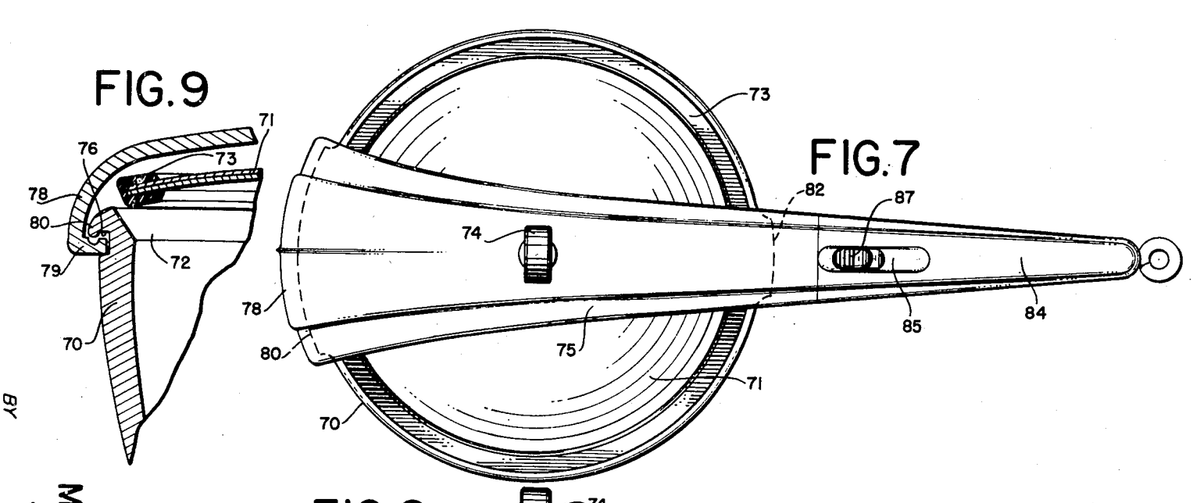
Fig. 7 is a top plan view of a second embodiment of pressure cooker according to the invention slightly different from the form shown in Fig. 1.
Fig. 9 is an enlarged fragmentary elevation corresponding to Fig. 8, but showing the unsealed position of the cover sealing means.
Figure 8:
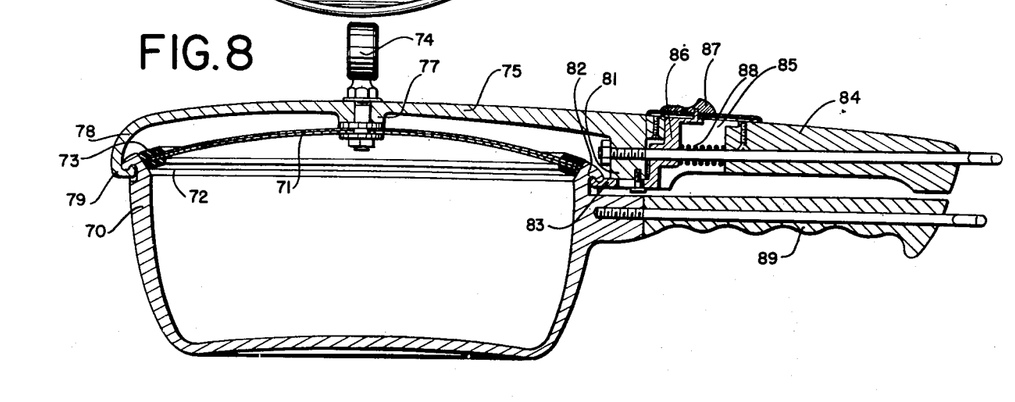
Fig. 8 is a sectional elevation of the cooker shown in Fig. 7, and showing the cover sealing means in sealing position.
Figures 10, 11, 12, 13:
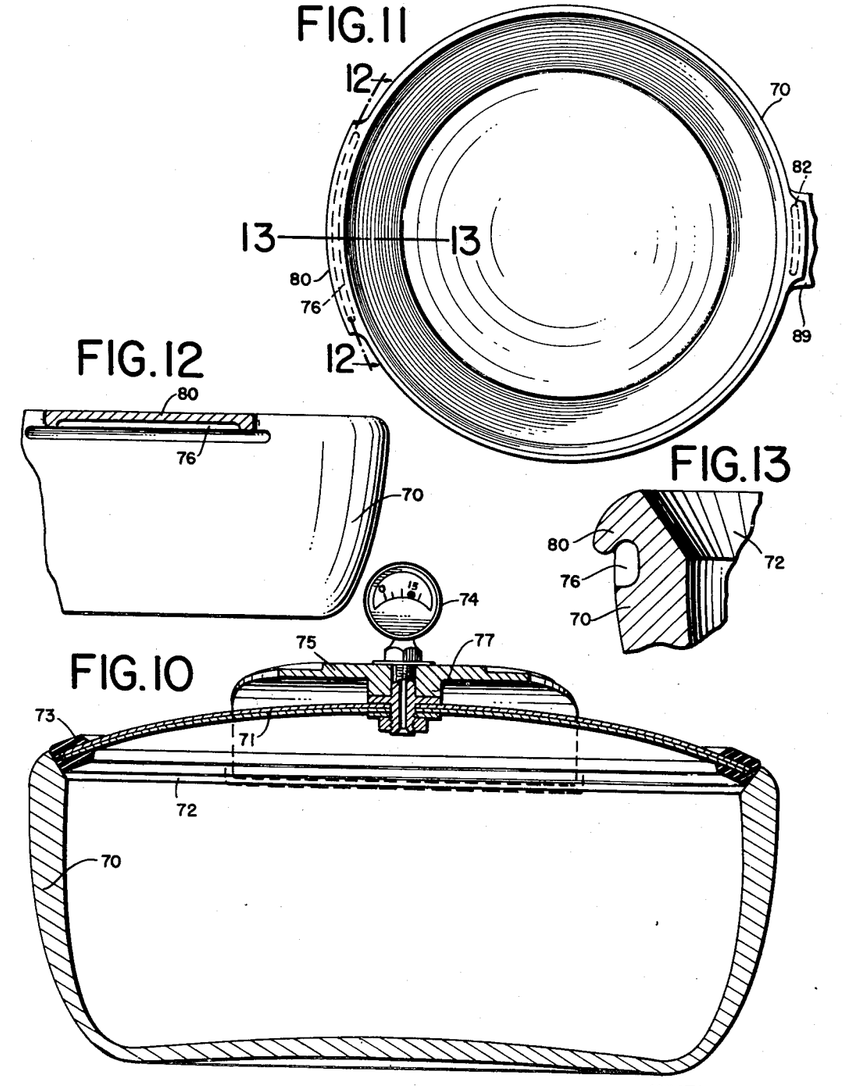
Fig. 10 is an enlarged sectional elevation taken at right angles to Fig. 8.
Fig. 11 is a top plan view of the cooker body with the cover assembly removed.
Fig. 12 is a fragmentary side elevation, partly in section, of the cooker body taken at line 12—12 of Fig. 11.
Fig. 13 is a detail cross-section of the rim of the cooker body taken at line 13—13 of Fig. 11.
Figures 14, 15:
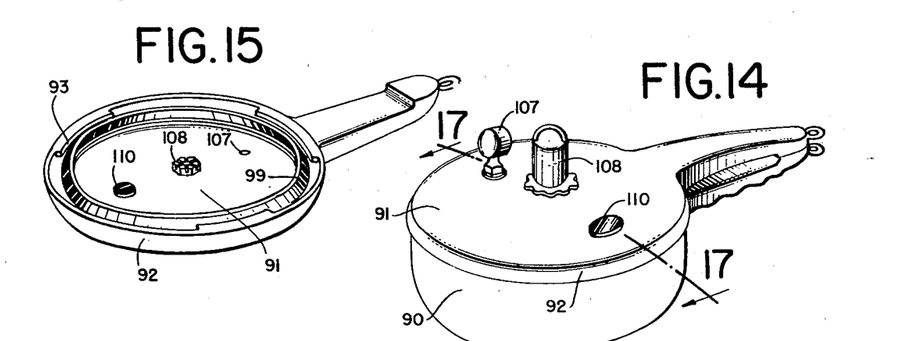
Fig. 14 is a perspective view of a third embodiment of pressure cooker according to the invention.
Fig. 15 is a perspective view of the cover of the cooker of Fig. 14, the cover being inverted to show certain details.
Figures 16, 17, 18:
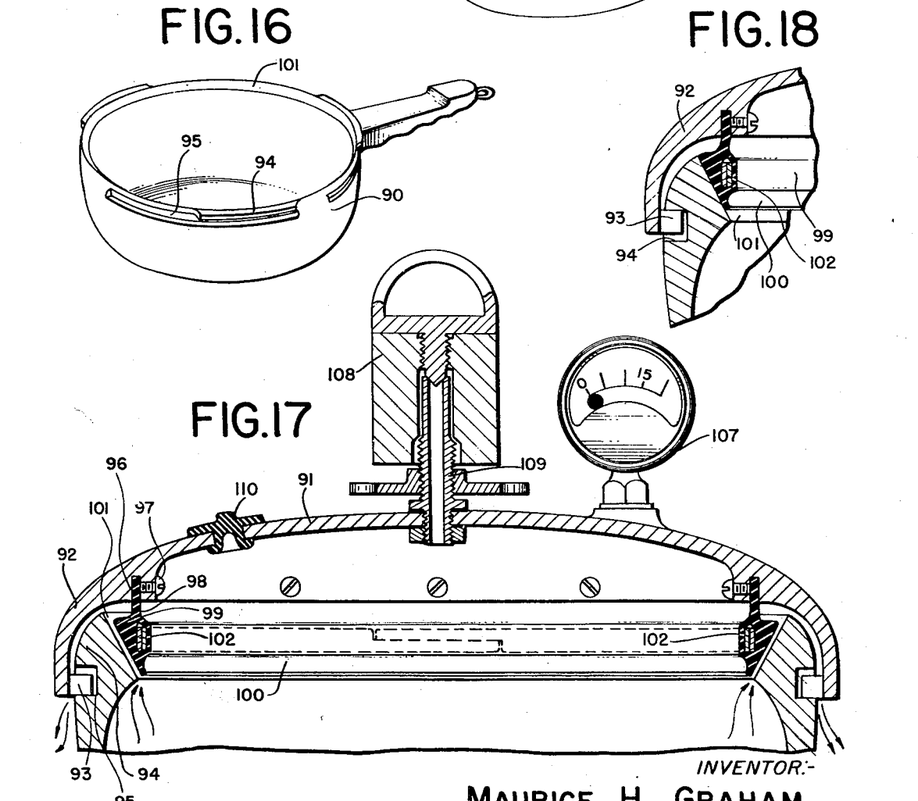
Fig. 16 is a perspective view of the cooker body with the cover removed.
Fig. 17 is an enlarged sectional elevation taken at line 17—17 of Fig. 14, and showing the cover sealing means in non-sealing position.
Fig. 18 is a fragmentary sectional elevation corresponding to Fig. 17, but showing the sealing position of the cover sealing means.

As in the previous embodiment the cover is formed and arranged to provide an air vent at room temperature and during heating of the cooker up to the point where steam is generated in sufficient quantity to drive the air out of the cooking chamber. The initial position of the cover is shown in Fig. 9. When the steam condition has been reached the cover will have warped to the position shown in Fig. 8 to produce a seal between gasket 73 and seat 72. Whereas in the previous embodiment the tightening and maintenance of a pressure-tight seal was in part produced by internal pressure, in the present form of the invention maintenance of the seal is dependent solely on temperature which acts through the cover as the temperature continues to increase to stress the gasket against its seat. As above mentioned, however, the cover is so designed that excess pressure above a predetermined maximum cooking pressure will overbalance the thermally developed downward force exerted by the cover to deform the cover upwardly sufficiently to break the cover seal. As soon as the excess pressure has been relieved the cover will spring downwardly again to reestablish the seal. Such temporary breaking of the cover seal and venting of pressure may occur an indefinite number of times during the course of a cooking period, depending primarily on how high a cooking heat is applied to the pressure cooker.

At the end of the cooking period the cover will automatically warp upwardly in response to cooling to automatically break the cover seal. Thus the present embodiment constitutes a pressure cooker which initially vents air, is automatically sealing in response to temperature, maintained with a pressure-tight seal in response to temperature, vented automatically in response to excess pressure and automatically unsealed in response to cooling.

The mounting for the bimetallic cover in the embodiment under description is the equivalent of that in the first embodiment, but different in detail. The mounting here comprises a single member 75 adapted to extend diametrically across the cooker body and having a central depending hub 77 to which the center of the bimetal cover 71 is secured with a pressure-tight connection. The mounting is formed of rigid metal and is of greater width at one end than the other. The wider end is turned downwardly to form a relatively wide supporting leg 78 having at its bottom an inturned lug 79 adapted to interlock with a relatively wide lug 80 formed on the outer periphery of cooker body 70. The inner end of lug 79 is received in a recess 76 underlying lug 80. The opposite end of mounting 75 has a narrower supporting leg 81. Slidably secured to the underside of the leg is a latch 83 adapted to interlock with an undercut lug 82 formed on the outer periphery of the cooker body. Also secured to mounting leg 81 is a handle 84 which is recessed at 85 to receive an actuating member 86 for latch 83. A knob 87 on the top side of the handle connects with the upper end of member 86. A spring 88 acts on member 86 to normally retain latch 83 in locking position. Knob 87 is movable to the right to withdraw latch 83 from engagement with lub 82 on the cooker body, permitting the mounting and its attached cooker cover to be swung upwardly, after which interlocking lugs 79 and 80 at the other end of the mounting can be released and the whole cover assembly entirely removed from the cooker body.

Because the cover in the present embodiment is designed to break the cover seal in response to excess pressure for venting purposes it is unnecessary to employ an auxiliary pressure relief valve as conventionally. A pressure gauge 74 may be provided. As before this will be mounted on the cover mounting 75 instead of on the cover itself, and will communicate with the interior of the cooker through the central connection between the mounting and cover.

The embodiment shown in Figs. 14 through 18 differs from previously described embodiments in that the main cover member 91 as well as the cooker body 90 are of rigid construction. Again, however, automatically responsive cover sealing means is employed which may function independently of the securing connection between the cover and body.

The rigid metal cover member 91 is provided with a downturned peripheral flange 92 having a plurality of circumferentially spaced inturned lugs 93 at its lower end adapted to seat on cutaway shoulders 95 formed on the outer side of the cover body adjacent the top opening. A series of lugs 94 project outwardly from the body and overlie a portion of the length of the cut-away shoulders. The cover is secured by placing it on the cover body and then rotating it to bring cover lugs 93 beneath body lugs 94. It will be noted by reference to Fig. 17 that lugs 93 are so arranged as to leave an annular space between the inner surface of the cover and the wall of the cooker body for venting purposes. The lugs 93 and 94 need not be of the usual camming type for this reason, and for purposes hereafter referred to it is desirable that body lugs 94 be spaced from shoulders 95 a distance greater than the thickness of cover lugs 93 to permit limited vertical movement between the cover and the cooker body, as in the above embodiments.

Figure 19:
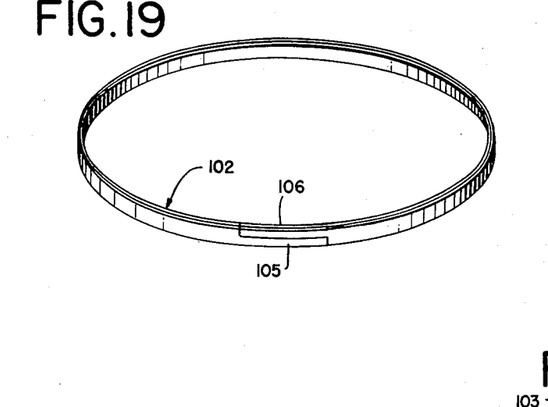
Fig. 19 is a perspective view of the split expansible bimetallic ring element employed with the cover sealing means according to Figs. 17 and 18.
Figure 20:
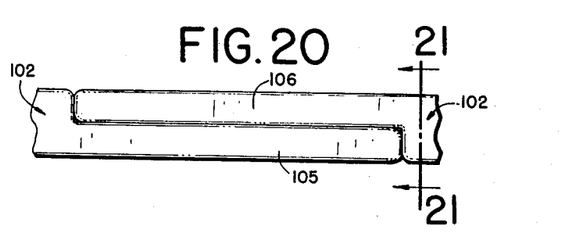
Fig. 20 is an enlarged fragmentary side elevation of the same ring showing the split ends.
Figure 21:
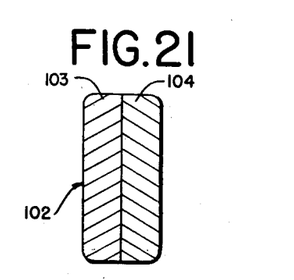
Fig. 21 is a further enlarged cross-section of the ring taken at line 21—21 of Fig. 20.

An annular downwardly facing channel 96 is formed in the undersurface of the cover in which is secured by screws 97 or other fastening means in sealing relation the base flange 98 of a flexible sealing gasket 99. Such gasket has a depending lip 100 and an inclined peripheral surface adapted to make sealing engagement with the beveled sealing seat 101 surrounding the top opening of the cooker body. The diameter of gasket 99 is slightly less than that of the seat 101 to provide an annular space therebetween which communicates with the space between the cover flange 92 and the outer side of the cooker body for venting purposes. Gasket 99 is formed with a central circumferentially extending channel in which is located an auxiliary deformable metal element 102. As best shown in Figs. 19 to 21 such element is in the form of a split thermostatic ring adapted to expand and contract in diameter in response to temperature changes. Such ring is of bimetal with inner and outer laminations 103 and 104 whose different coefficients of expansion serve to cause the ring to expand in response to increase in temperature and contract in response to decrease in temperature. Preferably the ends 105 and 106 of the ring are cut away and lapped. It is preferable that the ring seat loosely in the interior of gasket 109 to permit relative movement therebetween, it being understood that the ring should be of rubber or similar stretchable material adapted to expand and contract in diameter with the ring.

When the cover is secured on the cooker body the thermostatic ring and gasket will be in contracted condition, leaving a vent between seat 101 and the coacting sealing surface of the gasket. During initial heating of the cooker during the first part of the cooking period air will be vented as steam is generated. Ring 102 will gradually expand to cause expansion of the gasket itself into sealing engagement with seat 101. As heating continues the thermostatic ring will tend to further expand and stress the gasket against the seat to aid in the maintenance of a pressure-tight seal during the rest of the cooking period. Once initial sealing has been effected in response to temperature pressure begins to build up within the cooker, and this acts on lip 100 of the gasket located below the level of ring 102 so that tightening and maintenance of the seal is accomplished in response to temperature as well as pressure. It will be apparent that the higher the internal pressure in the cooker the tighter will be the seal between the cover and the cooker body. It will be apparent that the present embodiment is so designed that even substantial excess internal pressure will not break the cover seal since pressure always acts laterally against gasket 100 and cannot exert a force in a direction serving to move the gasket away from seat 101. Accordingly, in addition to a pressure gauge 107 a pressure relief valve 108 is provided, the same being mounted on a hollow tube 109 secured to the cover and in communication with the interior of the cooker. Conventional deformable pressure relief plugs such as 110 may also be provided in the cover if desired as an additional safety measure.

As before mentioned, the cover 91 is capable of limited movement relative to the cooker body. As the thermostatic ring expands the gasket under heating the cover may lift slightly from the position shown in Fig. 17 to that shown in Fig. 18 until the cover lugs 93 engage the underside of body lugs 94. This insures a reliable pressure-tight seal throughout the entire circumference of the sealing surfaces.

At the end of the cooking period when heat is removed the cooker begins to cool. While thermostatic ring 102 is adapted to automatically break the cover seal by contracting gasket 99, this action will be slower than in previous embodiments due to the fact that the ring will be influenced by heat absorbed by the gasket. It is not necessary, however, to await actual breaking of the cover seal before removing the cover. As soon as the ring and gasket have contracted only slightly the binding engagement between the cover and body lugs 93 and 94 will be discontinued as the cover drops slightly. Assuming that the gasket has been contracted sufficiently to no longer be actually stressed against seat 101, the cover can be rotated to free the lugs and then removed from the cooker body.

Figure 22:
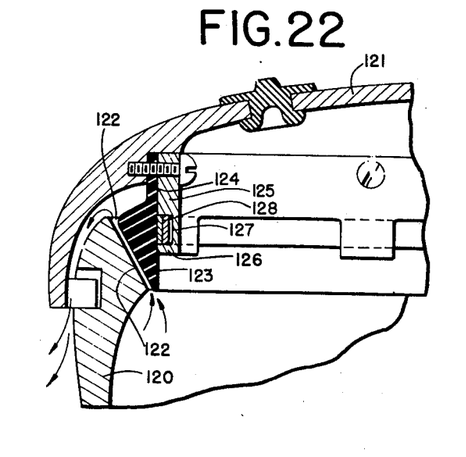
Fig. 22 is a fragmentary sectional elevation showing a fourth embodiment of sealing means involving a modification of the arrangement shown in Fig. 17, and showing the non-sealing position of the sealing means.
Figure 23:
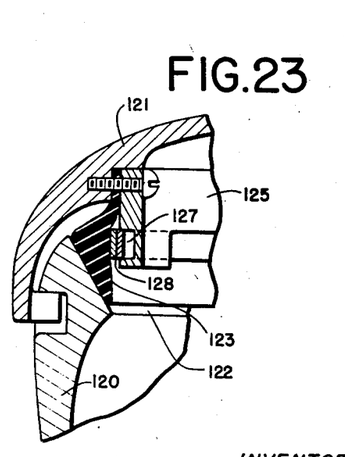
Fig. 23 is a similar fragmentary sectional elevation showing the sealing position of the sealing means.

The embodiment shown in Figs. 22 and 23 is generally similar to that of Figs. 14 to 18. The body 120 and cover 121 are both of rigid metal. Surrounding the top opening of the body is a beveled sealing seat 122 adapted to be engaged by a flexible gasket 123 having a base flange 124 secured in sealing relation to cover 121. For convenience in construction a metal securing ring 125 is fitted inside gasket base flange 124 and detachably secured by screws to cover 121.

To expand and contract gasket 123 to and from sealing engagement with seat 122 a thermostatic ring 128 is provided. In this case the same is located back of gasket 123, being supported for free expansion and contraction in outwardly facing channels 127 formed in a series of circumferentially spaced depending elements integral with ring 125.

As in the previous embodiment the cover seal will be effected following initial venting in response to increasing temperature which causes thermostatic ring 128 to expand gasket 123. The shape and the mounting of the gasket is such that temperature acting through the ring and pressure will function cooperatively to tighten and maintain the cover seal throughout the cooking period. Contraction of the thermostatic ring upon sufficient cooling of the interior of the cooker will cause the ring to contract, thereby releasing gasket 123 from sealing engagement with body seat 122.

The embodiment illustrated in Figs. 24 to 28 shows an automatically responsive cover sealing arrangement wherein the movable parts of the sealing means are associated with the the cooker body instead of forming a part of the cover structure. In this embodiment the cooker body 130 and cover 131 are both of rigid metal. An enlarged flange 132 is formed on the cover having an inclined sealing seat 133 on its inner face. The cooker body 130 is formed with an upstanding top flange 134 of reduced diameter having locking recesses 135 adapted to engage inwardly projecting lugs 136 located on the cover above flange 132 upon rotation of the cover by handle 141 relative to the cooker body and handle 142.

Located in the annular space formed between cover flange 132 and body flange 134 is a flexible sealing gasket 137 having an inclined outer face adapted to make sealing engagement with seat 133, and having a base flange 138 adapted to be secured in sealing relation in an annular upwardly facing channel 139 in the cooker body at the base of flange 134. A thermostatic ring 140 is provided to actuate gasket 137. In this case, as in the embodiment of Figs. 15 to 18, the thermostatic ring is imbedded in gasket 137, but it will be understood that the thermostatic ring may be supported independently by the cooked body back of gasket 137 as in the embodiment of Figs. 22 and 23.

Figures 24, 25, 28:
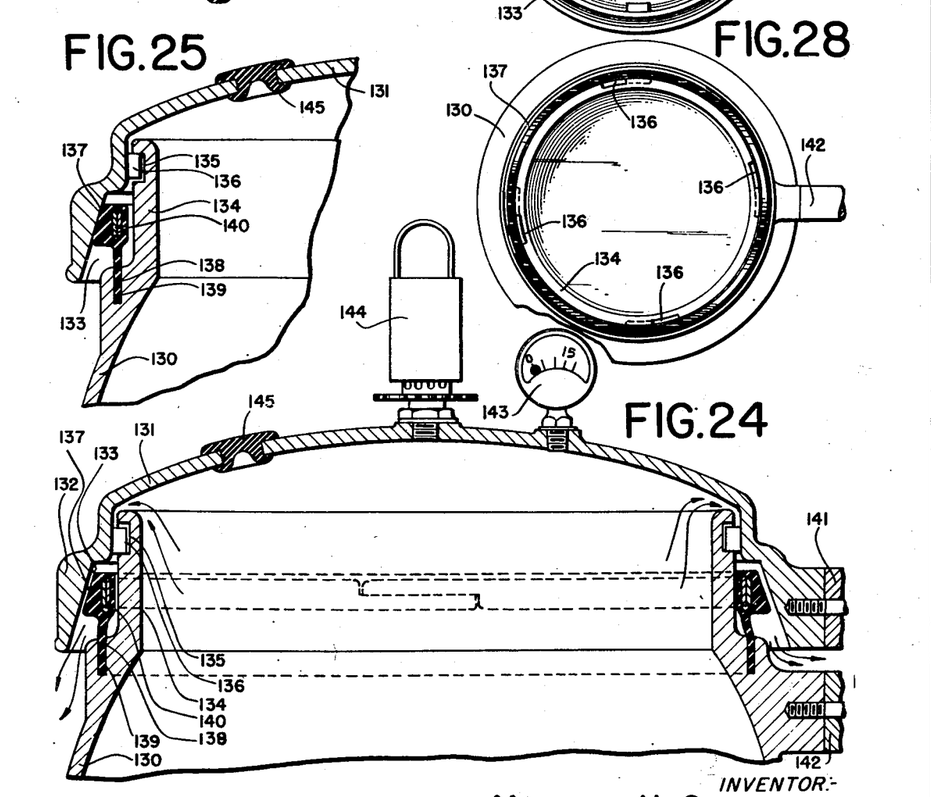
Fig. 24 is a fragmentary sectional elevation of a fifth pressure cooker embodiment according to the invention showing a reverse arrangement of the parts of the cover sealing means from the embodiment of Fig. 17, the sealing means being in non-sealing position.
Fig. 25 is a fragmentary sectional elevation corresponding to Fig. 24, but showing the sealing position of the cover sealing means.
Fig. 28 is a top plan view of the cooker body of Fig. 24.
Figure 26:
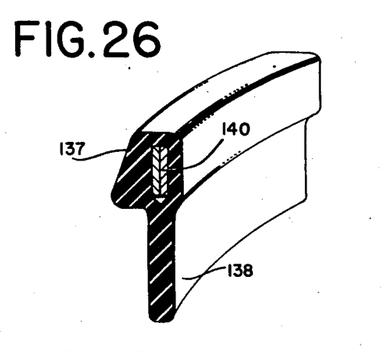
Fig. 26 is an enlarged perspective of a section of one of the cover sealing elements.
Figure 27:
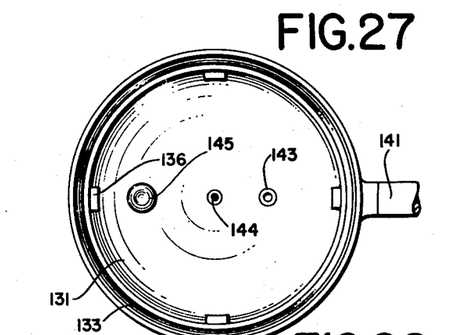
Fig. 27 is a plan view of the underside of the cover of Fig. 24.

As will be observed in Fig. 24 the cover is designed to provide a venting space between the cover and body flange 134. The cover seal is effected automatically by expansion of thermostatic ring 140 and gasket 137. Once a preliminary seal has been effected between the gasket and seat 133, internal pressure building up in the cooker will exert an outward lateral force on the inner side of flange 137 to function in conjunction with the outward stressing of the gasket by the temperature responsive ring to tighten and maintain a pressure-tight seal throughout the cooking period. Upon cooling at the end of the cooking period ring 140 will contract to release gasket 137 from sealing engagement with seat 133. In addition to pressure gauge 143 an emergency pressure relief valve 144 and pressure blow-off plugs 145 are provided on the cover. This will preferably be open at the end of the cooking period to relieve the internal pressure, thus releasing the internal pressure acting on gasket 137 so that the cover may be removed as soon as thermostatic ring 140 has contracted slightly.

Figures 29, 32:
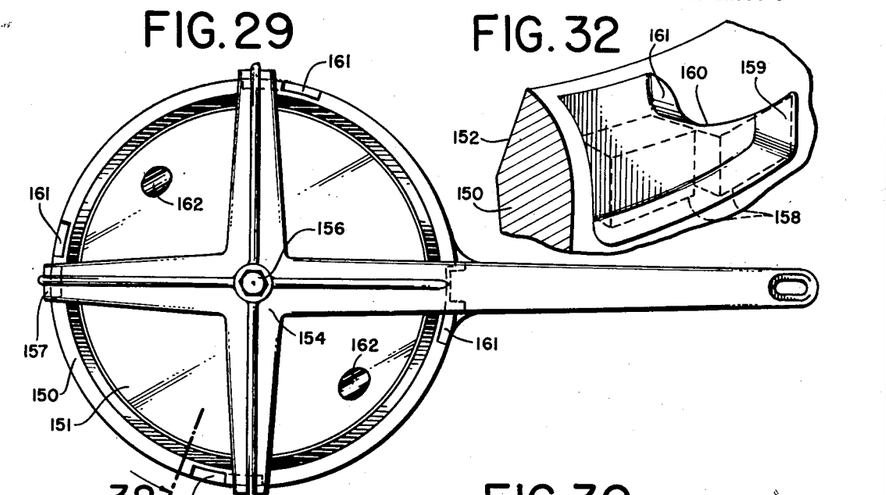
Fig. 29 is a top plan view of a sixth embodiment of pressure cooker according to the invention generally resembling the embodiment of Fig. 1.
Fig. 32 is an enlarged fragmentary perspective view of a section of the upper rim of the cooker body at line 32 of Fig. 29 showing a cover connecting element slightly different from that of Fig. 6.
Figure 30:
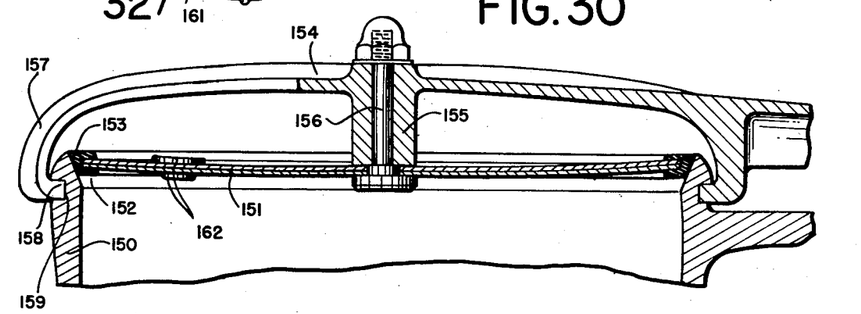
Fig. 30 is a fragmentary sectional elevation of the cooker of Fig. 29 showing the cover construction in sealing position.
Figure 31:
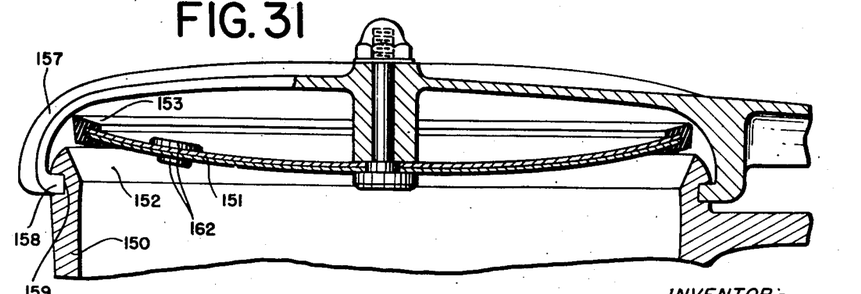
Fig. 31 is a fragmentary sectional elevation similar to Fig. 30, but showing the cover in non-sealing position.

In some instances I employ a deformable cover structure which is not self-sealing and where the securing connections between the cover and cooker body are depended upon to effect and maintain the cover seal. The cover is designed to deform in response to internal cooker conditions to break the cover seal. This is illustrated in the embodiment of Figs. 29 to 32. The cooker body 150 is closed by a deformable cover 151 having a peripheral flexible gasket 153 adapted to sealing engagement with the beveled seat 152 surrounding the top opening of the cooker body. A rigid mounting 154 has a depending hub 155 to which the center of cover 151 is secured by a bolt 156 or other suitable connecting means. Mounting 154 has depending legs 157 provided at their lower end with inturned lugs 158 receivable in connecting recesses 159 formed in the outer top side wall of the cooker body. As best shown in Fig. 32 such recesses have inclined cam surfaces 160 and adjoining upwardly extending cut-out portions 161. The lugs pass downwardly through the cut-out portions, and by rotating the mounting lugs 158 are drawn downwardly by the cam surfaces to bring gasket 153 of the cover into pressure-tight sealing engagement with seat 152.

Cover 151 is made of sheet metal sufficiently stiff to resist deformation during continuance of normal cooking pressure, but of such character as to be deformed upwardly in response to temperature whenever the internal cooker temperature exceeds a selected maximum, thereby functioning as an automatic pressure relief vent. To the latter end the deformable cover 151 will comprise bimetal so as to function thermostatically. The arrangement of the bimetal will be the reverse of that employed in the embodiments of Figs. 1 to 6 and Figs. 7 to 13 so that the cover will be formed upwardly instead of downwardly in response to increasing temperature. With such an arrangement the cover will remain in sealed engagement with the cooker body as in Fig. 30 as long as normal cooking temperature prevails. In the event the temperature rises unduly so as to overheat the cooker and generate dangerous pressures, cover 151 will deform upwardly to break the cover seal as in Fig. 31, thereby permitting pressure to vent from the cooker. It will be observed that gasket 153 is so formed as in the embodiment of Figs. 7 to 13 that internal pressure does not act to maintain the same in sealing engagement, thereby enabling relatively slight upward deformation of the cover to break the seal between gasket 153 and seat 152. The cover will remain unsealed as long as the temperature remains excessive, but is designed to deform downwardly when the temperature is reduced to normal cooking range to reestablish the cover seal.

The cover means in the embodiments of Figs. 1 to 6, 7 to 13 and 29 to 32, are rigidly secured through bolts to the mountings by which they are detachably connected to a pressure cooker body. To facilitate thorough cleaning the nuts of the securing bolts may be removed and the cover means separated from the mountings for washing individually. Cleaning may also be facilitated without removing the cover means from the mounting by securing the cover to the mounting for relative turning movement so that portions of the cover which are obstructed by parts of the mounting may be brought to a position where they may be easily cleaned. One arrangement to accomplish the latter purpose is shown in Figs. 33 to 35.

Figure 33:
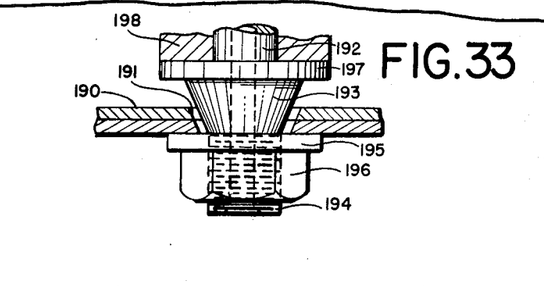
Fig. 33 is a view partly in elevation and partly in section of one form of connecting means for securing a cover for turning movement on its mounting.
Figure 34:
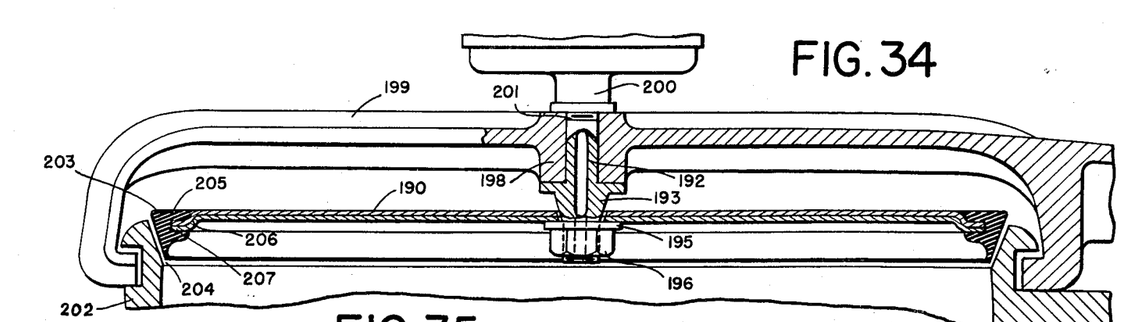
Figs. 34 and 35 are fragmentary sectional elevations of a pressure cooker generally similar to that shown in Figs. 1 to 6 employing the securing means of Fig. 33, and respectively showing the cover means in unsealed and sealed positions.
Figure 35:
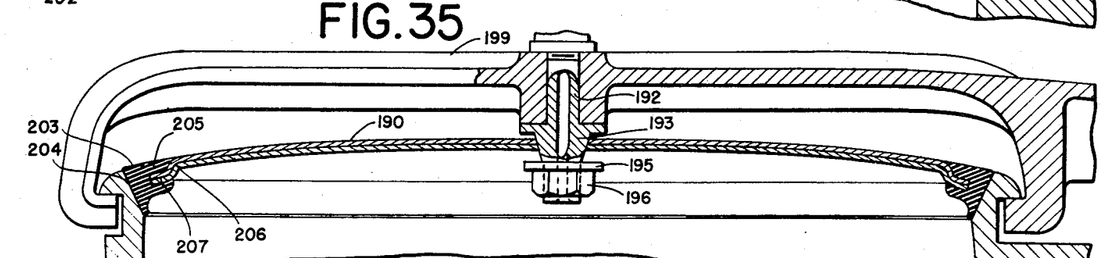

In the embodiment of Figs. 33 to 35 I have illustrated a pressure cooker representing a modification of that illustrated in Figs. 1 to 6, but it will be understood that the cover means may be mounted for turning movement on their mounting in other previously described embodiments. The cover means illustrated comprises a deformable bimetallic member 190 provided with a central aperture having an axially tapering surrounding surface 191. Stationary securing bolt 192 has a conical enlargement 193 which at one end is of smaller diameter than the cover aperture and of greater diameter at its other end, being, however, of the same taper. A threaded bolt end portion 194 extends beyond the smaller end of enlargement 193, and secured thereon are a washer 195 and nut 196. A flange or shoulder 197 at the enlargement end of greater diameter is adapted to seat in sealing engagement against the end of depending hub portion 198 of the cover mounting 199 when threaded member 200 is tightened on the threaded upper end 201 of bolt 192 which protrudes above the upper side of the mounting.

When cover 190 is located at the smaller end of bolt enlargement 193 and rests on washer 195, as in Figs. 33 and 34, it is free to turn thereon and relative to mounting 199. When moved axially towards the enlargement end of greater diameter the tapering cover aperture surface 191 is brought into sealing engagement with the surface of the enlargement, as in Fig. 35, and the cover becomes rigid with the securing bolt and mounting. Of course cover aperture surface 191 and the conical surface of bolt enlargement 193 should be carefully machined to insure a pressure tight seal under such conditions. Also, since only limited axial movement on the bolt and easy release and return of the cover to its turning position are desirable, such surfaces are preferably formed with a fairly sharp taper, say in a range of 20° to 30°.

When mounting 199 is attached to cooker body 202 at the beginning of a cooking operation, cover 190 is loosely supported by washer 195 on the smaller portion of bolt enlargement 193 and cover sealing gasket 203 is spaced from its coacting sealing seat 204 on the cooker body, all as will be clear from Fig. 38. The pressure cooker is vented to the atmosphere. When heating of the cooker has reached the stage when steam is generated the bimetal cover deforms downwardly to bring gasket 203 into preliminary engagement with seat 204. The central portion of the cover then rises on bolt enlargement 193 until it reaches the portion thereof of the same diameter as the cover aperture. The tendency of the cover to further deform in response to heating from the position of the part shown in Fig. 35 sets up a downward stress at the cover periphery to produce a presure-tight seal between gasket 203 and seat 204, and sets up an upward stress at the center of the cover to produce a pressure-tight fit between cover aperture surface 191 and bolt enlargement 193. As in the embodiment of Figs. 1 to 6 gasket 203 is provided with a downwardly extending lip so that internal pressure within the cooker will act to maintain a pressure tight seal.

When cover 190 is cooled at the end of the cooking operation it deforms upwardly. Once sealing engagement of gasket 203 is broken the center of the cover will drop on bolt enlargement 193 and again assume its rest position on washer 195 so as to be free to turn relative to mounting 199. When the mounting and cover are removed from the cooker body the cover may be turned relative to the mounting to expose portions of its surface which underlie the mounting for easy washing.

To prevent accumulation of water on the upper side of the cover, the upper surface of flange 205 of sealing gasket 203 is made flush with the upper surface of cover 190. This is accomplished by forming cover 190 with an annular shoulder 206 and a downwardly offset peripheral edge portion 207.

It will be evident from the various embodiments which have been described that the invention in its broadest aspects may employ a variety of different structural arrangements which have individual advantages from the standpoint of both structure and function to provide sealing means which is automatically responsive to pressure cooker conditions, to maintain a pressure-tight seal under normal cooking condition, break the seal either or both when conditions become excessively high and at the termination of the cooking period.

The drawings show forms of pressure cookers designed for use on stoves, and it will be evident to those skilled in the art that the automatically responsive sealing means of the invention is equally applicable to electrically heated types of pressure cooker incorporating electric heating elements in the cooker base or having a detachable base containing electric heating elements.

The invention comprehends not only a complete pressure cooker, but an automatically responsive pressure cooker cover device adapted to be employed with the cooker body portion of various existing types of pressure cooker. It will have been evident in the embodiments described that the mounting or securing means by which the cover structure is detachably secured to the cooker body for automatic adjustment of the seal may take a variety of forms. Depending upon the type of connecting means and the position and shape of the cover sealing seat of conventional pressure cookers, the forms of the invention employing a deformable cover member will be most appropriate in some instances while the form of the invention employing a rigid cover member with a gasket adjustable by an auxiliary deformable element will be more appropriate in other instances.

It is to be understood that while a variety of embodiments of the invention have been illustrated and described they are only exemplary, and the scope of the invention is to be determined by the accompanying claims.

I claim:

1. A pressure cooker comprising a housing containing a pressure cooking chamber adapted to receive articles to be cooked and having a top opening, a cover for said opening, and temperature-responsive self-opening sealing means for said cover, a coactive seat and means mounting the cover on the housing independently of the sealing means and seat and adapting the sealing means to self-opening movement to a position spaced from the seat.

2. A pressure cooker comprising a housing containing a pressure cooking chamber adapted to receive articles to be cooked and having a top opening, a cover for said opening, and self-opening sealing means for said cover responsive to cooling of the housing below cooking temperature, a coactive seat and means mounting the cover on the housing independently of the sealing means and seat and adapting the sealing means to self-opening movement to a position spaced from the seat.

3. A pressure cooker comprising a housing containing a pressure cooking chamber adapted to receive articles to be cooked and having a top opening, a cover for said opening, and temperature-responsive self-closing sealing means for sealing said cover, a coactive seat and means mounting the cover on the housing independently of the sealing means and seat so as to adapt the sealing means to self-closing movement from a position in spaced relation to the seat into engagement therewith.

4. A pressure cooker comprising a housing containing a pressure cooking chamber adapted to receive articles to be cooked and having a top opening, a cover for said opening, and temperature-responsive self-closing sealing means for sealing said cover in response to heating of the housing, a coactive seat and means mounting the cover on the housing independently of the sealing means and seat so as to adapt the sealing means to self-closing movement from a position in spaced relation to the seat into engagement therewith.

5. A pressure cooker comprising a housing containing a pressure cooking chamber adapted to receive articles to be cooked and having a top opening, a cover for said opening, and self-closing and self-opening sealing means for said cover responsive to predetermined changes in temperature conditions in the housing and a coacting seat and means mounting the cover on the housing for self-movement of the sealing means between a position spaced from the seat and sealing engagement with the seat.

6. A pressure cooker comprising an open-topped cooker body housing a pressure cooking chamber adapted to receive articles to be cooked, a cover sealing seat on said cooker body, a cover sealing element adapted to engage said seat and responsive to internal cooker pressure to maintain pressure-tight engagement with the seat, a temperature-deformable self-closing bimetallic cover member mounting said sealing element and being deformable in response to heating of the cooker to move the sealing element into engagement with said seat, and means for detachably securing the cover member to the cooker body with the cover sealing element in spaced relation to the seat for self-closing action.

7. A pressure cooker comprising an open-topped cooker body housing a pressure cooking chamber adapted to receive articles to be cooked, a cover sealing seat on said cooker body, temperature-deformable self-closing and self-opening bimetallic cover means adapted to make pressure-tight sealing engagement with said seat and adapted to close in response to heating of the cooker and open in response to cooling of the cooker, and means independent of the seat secured to the cover means and detachably securing the cover means to the cooker body for self-closing movement into engagement with the seat and self-opening movement to a position spaced from the seat.

8. A pressure cooker comprising an open-topped cooker body housing a pressure cooking chamber adapted to receive articles to be cooked, a cover sealing seat on said cooker body, a temperature responsive deformable bi-metallic cover member having a sealing surface adapted to make pressure-tight sealing engagement with said seat and adapted to be located in spaced venting relation to said seat at different temperatures, rigid cover mounting means connecting with the center area of the cover member and being spaced from the cover member outwardly of its central area to provide for deformation of the cover member in response to internal cooker temperature, and means for connecting the cover mounting to circumferentially spaced side portions of the cooker body and adapted to support the cover member in spaced relation to the seat.

9. A pressure cooker comprising open-topped cooker body means housing a pressure cooking chamber adapted to receive articles to be cooked, cooker cover means, a cover sealing seat on one of said means, a flexible cover sealing gasket adapted to make pressure-tight engagement with said seat mounted on the other of said means, a thermostatic element controlling sealing engagement between the cover sealing gasket and said seat, and means for detachably securing the cover means to the cooker body means for control of the gasket by the thermostatic element and adapted to support the sealing gasket in spaced relation to the seat.

10. A pressure cooker comprising housing means containing a pressure cooking chamber adapted to receive articles to be cooked, removable cover means for said housing means, one of said means including a seat, the other of said means including a sealing element having movement between a venting position spaced from said seat and a sealing position in engagement with said seat, the other said means also including a temperature responsive member movable in response to changing temperature to move the sealing element from one to the other of its said positions relative to said seat, and mounting means detachably securing the cover means on the housing means independently of the sealing element and seat and adapting the sealing element to be located in its spaced venting relation to the seat and to movement by the temperature responsive member into sealing engagement with the seat.

11. A pressure cooker comprising housing means containing a pressure cooking chamber adapted to receive articles to be cooked, removable cover means for said housing means, one of said means including a seat, the other of said means including a sealing element located in spaced venting relation to said seat at lower temperature and further including a temperature responsive member operative at elevated temperature to move the sealing element into sealing engagement with the seat, and mounting means detachably securing the cover means on the housing means independently of the sealing element and seat and with the sealing element in its spaced venting relation to the seat and adapting the sealing element to movement by the temperature responsive member into sealing engagement with the seat.

12. A pressure cooker comprising housing means containing a pressure cooking chamber adapted to receive articles to be cooked, a removable bimetallic cover for the housing adapted to deform in response to temperature changes, a seat on the housing, a sealing element on the cover coactive with the seat and adapted to movement relative thereto by deformation of the cover, and mounting means connecting with the cover centrally thereof and located in spaced relation with the surrounding area of the cover so as not to interfere with deformation thereof, said mounting means detachably securing the cover to the housing independently of the sealing element and seat and adapting the cover to locate the sealing element in sealing engagement with the seat and in spaced venting relation to the seat.

13. A pressure cooker comprising a cooker body housing a cooking chamber and having a top opening surrounded by a sealing seat, a bimetallic cover having a peripheral sealing surface coactive with said seat and operative to deform into sealing engagement with the seat in response to temperature, locking surfaces on diametrically opposite sides of the cooking body, a rigid supporting arm extending diametrically across the top of the cooker body and having downwardly projecting locking portions detachably engaging the opposite locking surfaces on the cooker body and supporting the arm in spaced relation above the cover, a rigid hub projecting downwardly from the middle area of the arm and secured in rigid relation to the arm, said hub being rigidly secured to the central area of the cover and supporting the cover in spaced relation with the seat and for deformation in response to temperature into sealing engagement with the seat and said hub having an undersurface adapted to reinforce the cover for an area outwardly of its center against internal pressure within the cooker.

14. A pressure cooker comprising housing means containing a pressure cooking chamber adapted to receive articles to be cooked, a removable bimetallic cover for the housing adapted to deform in response to temperature changes, a seat on the housing, a sealing element on the cover coactive with the seat and adapted to movement relative thereto by deformation of the cover, and mounting means detachably securing the cover to the housing independently of the sealing element and seat and adapting the cover to locate the sealing element in sealing engagement with the seat and in spaced relation to the seat, said mounting means including a rigid supporting arm secured to the central area of the cover and located in spaced relation with the surrounding area of the cover so as not to interfere with deformation thereof, detachable hinge connecting means between one end of the arm and one side of the cooker body, means forming a locking surface on the side of the cooker body opposite said hinge connecting means and a locking latch movably mounted on the arm for releasable locking engagement with said locking surface.

MAURICE H. GRAHAM.

REFERENCES CITED

The following references are of record in the file of this patent:

UNITED STATES PATENTS

| Number | Name | Date |
|---|---|---|
| 1,311,957 | Ferris | Aug. 5, 1919 |
| 1,326,124 | Vischer, Jr. | Dec. 23, 1919 |
| 1,564,504 | Woolson | Dec. 8, 1925 |
| 1,665,827 | Tillman | Apr. 10, 1928 |
| 1,681,150 | Vischer, Jr. | Aug. 14, 1928 |
| 1,682,203 | Vischer, Jr. | Aug. 28, 1928 |
| 1,806,072 | Levy | May 19, 1931 |
| 1,838,446 | Plews | Dec. 29, 1931 |
| 1,848,031 | Spencer | Mar. 1, 1932 |
| 1,933,135 | Barthelmes | Oct. 31, 1933 |
| 2,008,835 | Rawcliffe | July 23, 1935 |
| 2,102,962 | Ludington | Dec. 21, 1937 |
| 2,198,125 | Nelson | Apr. 23, 1940 |
| 2,218,188 | Wittenberg | Oct. 15, 1940 |
| 2,333,993 | Frailing | Nov. 9, 1943 |
| 2,373,620 | Vischer, Jr. | Apr. 10, 1945 |
| 2,387,360 | Smith | Oct. 23, 1945 |

FOREIGN PATENTS

| Number | Country | Date |
|---|---|---|
| 485,051 | Great Britain | May 13, 1938 |